Aug. 31, 1948.
H. L. BLACK
2,448,349
TRACK CIRCUITS WITH BATTERY CHARGING
OR DEPOLARIZING MEANS
Filed Dec. 20, 1944
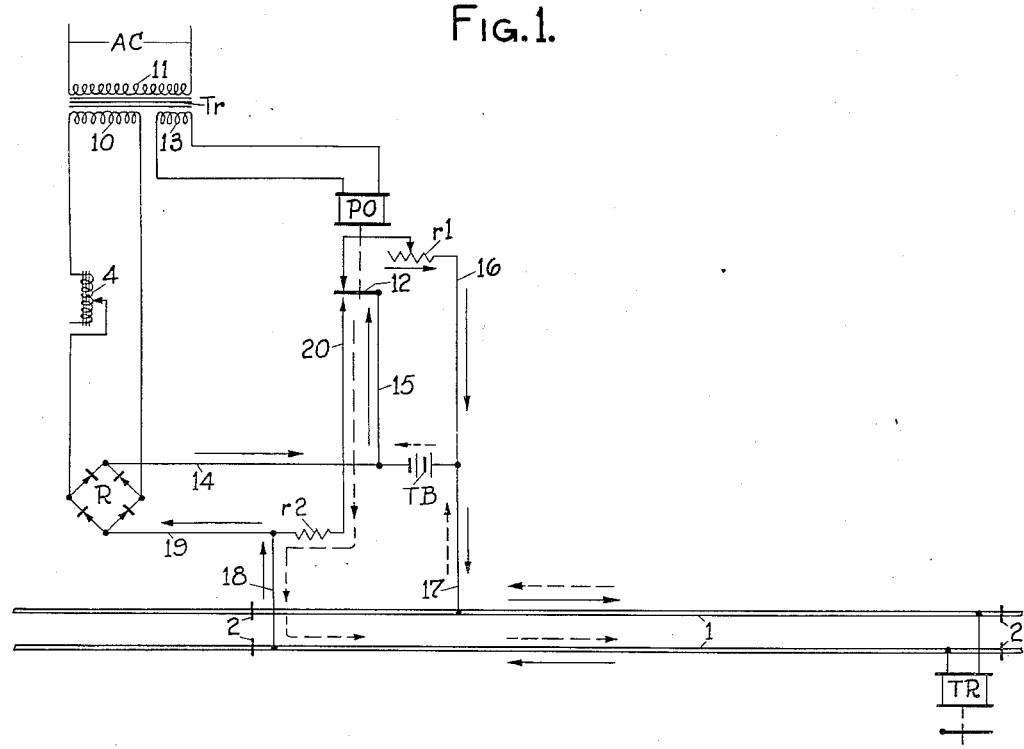
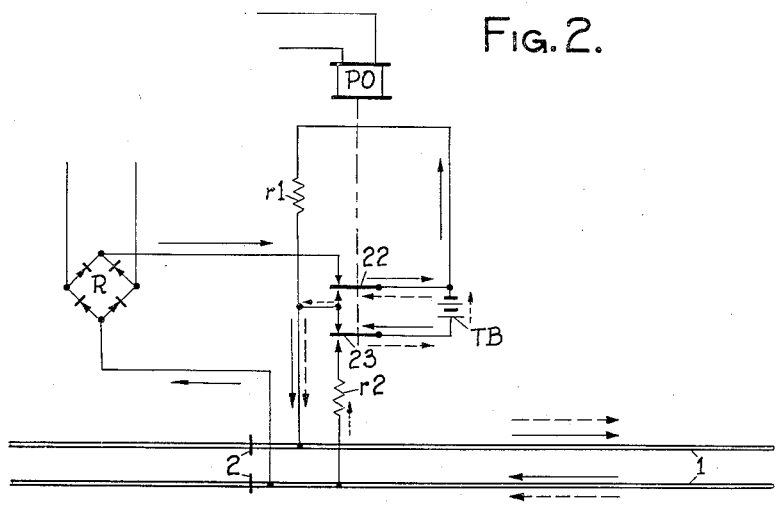
Inventor
H. L. Black,
By Neil W. Preston,
his Attorney Patented Aug. 31, 1948

2,448,349

UNITED STATES PATENT OFFICE 2,448,349

TRACK CIRCUITS WITH BATTERY CHARGING OR DEPOLARIZING MEANS

Harry L. Black, Moncton, New Brunswick, Canada, assignor to General Railway Signal Company, Rochester, N. Y.

Application December 20, 1944, Serial No. 568,991

14 Claims. (Cl. 246—41)

1

This invention relates to track circuits and more particularly to track circuits which are frequently occupied for appreciable periods by standing trains.

Track circuits which are located near loading platforms or on the side tracks of passing sidings frequently have a train standing thereon for a considerable time which may result in the draining of the track battery to an extent to result in the supply of insufficient current to pick up the track relay after the train leaves the track circuit. This is true irrespective of whether the track battery is a storage battery or a primary battery; and if a storage battery, it is true even though this storage battery may be connected to an alternating current source through trickle charge rectifying means. If it is a primary battery, the cost is also prohibitive.

In accordance with the present invention, it is therefore proposed to supply the track circuit with current through the medium of a rectifier fed from an alternating current source so long as alternating current is present and to use the flow of direct current from such rectifier to the track rails for the purpose of charging or discharging the battery at a very low rate in the case of a storage battery or a primary battery, respectively. It is also proposed to connect such battery across the track rails during a cessation of alternating current. To prevent the flow of excessive charging current through such storage battery while it is included in series with the rectifier circuit it is proposed, as a further object of the present invention, to apply a shunt resistance unit of predetermined resistance around the battery so that not all of the current which flows to the track rails will flow through the battery, in that part of this current will flow through such shunt resistance. Stating this in different words, the track circuit is preferably fed by current from the rectifier through a circuit including a resistance unit and the battery is then charged or discharged, as the case may be, by, or dependent upon, the voltage drop across said resistance unit.

Since the battery and the shunt resistance in multiple therewith represents a substantial amount of resistance, especially when the battery is a primary battery, this resistance may serve as a series resistance for the track circuit. During cessation of the alternating current, however, a series resistance is preferably included in series with the battery in accordance with another object of the present invention and the shunt resistance which was originally connected in multiple with the battery is preferably removed during the cessation of the alternating current as determined by a power-off relay.

Other objects, purposes and characteristic features of the invention will in part be pointed out in the specification and will in part be obvious from the accompanying drawings in which:

Fig. 1 shows one form of the invention; and
Fig. 2 shows a modified form of the invention.

*Structure.*—The track section comprises rails 1, insulated from the adjacent track by insulating joints 2, and may be located at a loading platform or comprise part of a side track which is frequently occupied for appreciable times by a standing train. This track section is preferably track circuited by apparatus including the usual bonded rails, a track relay TR, and the track source more specifically described hereinafter. In the usual track circuit the track battery TB would be connected across the track rails through the medium of wires preferably including a series resistance as is at times true of the structure shown in the drawings. Under normal conditions, however, applicant proposes to supply current to the track circuit including the track relay TR from a rectifier R, deriving its in-put alternating current through an adjustable reactance 4 from a secondary winding 10 of a transformer Tr, the primary winding 11 of which is connected to an alternating current source AC. Instead of supplying direct current energy directly from this rectifier R to the track rails, it is proposed to connect the track battery TB in series therewith with the polarity of the battery TB so poled in the circuit that the out-put voltage of the rectifier R and the voltage of the track battery TB oppose each other, that is, so that the track battery TB is included in series with the rectifier R in bucking relationship. The voltage delivered by the rectifier R is higher than the voltage of the battery TB so that the battery can be charged, if desired, as will be true if a storage battery is used. It should however be remembered that storage battery charging takes place, in considerable volume, only when the track circuit is shunted by a train under which condition its resistance is substantially zero, for this reason the out-put voltage of the rectifier R need not be much higher than the voltage of the battery TB. When a primary battery is used the rectifier out-put voltage may be lower than when a storage battery is used but it should still be higher than the voltage of such primary battery.

From this structure it is readily seen that since the current supplied to the track circuit by the rectifier R, and illustrated by solid arrows, flows in a direction from left to right through the resistance unit $r1$, that it is the ohmic value of this resistance, in combination with the track circuit current flowing, that determines whether the battery TB will be charged or discharged. In the event the battery TB is a storage battery the resistance of the unit $r1$ will be high enough to cause the battery to be charged at the minimum possible rate to take care only of occasional alternating current failures. If the battery TB is a primary battery, such as a potash battery, the ohmic value of resistance unit $r1$ is decreased to a value whereby the track circuit current flowing therethrough will not quite produce enough voltage drop to cause charging of the battery and to actually cause light discharging of the battery. A primary battery requires a light load thereon, that is, a small discharge, to keep it in good working condition by keeping it continuously depolarized. A storage battery, on the other hand, requires charging at a very low rate to keep it in good condition and fully charged.

Let us now give consideration to voltage relationships and resistances when the power-off relay PO assumes its energized position and the track circuit is unoccupied. Under conditions as illustrated in the drawings, that is with no train in the track section, there is no series resistance unit, such as is ordinarily used, included in the track circuit unless the resistance unit $r1$ were considered to be such a series resistance unit. For this reason the resistance of the track circuit consisting only of the resistance of the track rails and the track relay TR in series is very low. The ohmic resistance of the usual series resistance unit of a track circuit is about three times that of the resistance of the track rails and track relay in series. In other words, the voltage drop across the track rails with the power-off relay PO in its attracted position is only about 25 per cent that of the voltage drop across the entire track circuit including the series resistance $r2$, the track rails 1 and the track relay TR in series. For this reason the voltage drop across the track rails with the relay PO in its attracted position is about 25 per cent that of the voltage delivered by the battery TB and the voltage delivered by the rectifier R is about 125 per cent that of the voltage delivered by the track battery TB.

This power-off relay PO is energized from the secondary winding 13 of the transformer Tr and remains in its energized position so long as alternating current is available but drops to its deenergized position upon a cessation in the supply of alternating current. Deenergization of this power-off relay PO causes the front contact 12 thereof to open to thereby remove the shunt resistance $r1$ and causes the back contact 12 to close to thereby shunt the out-put side of the rectifier R through a shunt circuit including the series resistance unit $r2$. With the rectifier R shunted as just pointed out the track battery TB is connected directly across the track rails with the series resistance $r2$ included in series therewith. The resistance of the rectifier R in multiple with this resistance $r2$ is so high that it may be disregarded.

Obviously, if desired, the rectifier R may be entirely disconnected from the track circuit instead of shunting the rectifier R as just pointed out. Also, if desired, the track battery TB may upon the cessation of alternating current be connected across the track rails in such polarity relationship that the current supplied to the track circuit flows in the same direction through the track rails as is the case when derived from the track battery TB. Such a construction has been illustrated in the modification illustrated in Fig. 2. In this modification the contacts 22 and 23 replace the contact 12 and are so organized in the circuit that they not only connect the battery TB across the track rails during a current cessation but also produce a pole changing function.

*Operation.*—With the apparatus in its normal condition, as illustrated in the drawings, current is supplied to the track circuit including the track rails 1 and track relay TR through a circuit which may be traced from the positive terminal of the rectifier R, wires 14 and 15, front contact 12 of the power-off relay PO, resistance unit $r1$, wires 16 and 17, track rail 1, winding of the track relay TR, other track rail 1, wires 18 and 19, to the negative terminal of rectifier R. The flow of this current through the resistance unit $r1$ causes a potential drop which slightly exceeds the voltage of the track battery TB in the case of a storage battery so that a small amount of current also flows in a charging direction through the track battery TB. In this connection it is desired to point out that the resistance unit $r1$ which is preferably adjustable is so adjusted as to provide the desired average charging rate for the track battery TB. If the battery TB, on the other hand, is of the primary type the ohmic value of the resistance $r1$ is small enough to cause a slight discharge of the battery as is desirable to cause depolarization of the battery.

Let us now assume that the track circuit under consideration becomes occupied. Under this condition the flow of current from the rectifier R to the track rails is greatly increased and this increased current flows at least in part through the track battery TB so that this track battery TB, in the event it is a storage battery, has current flowing in a charging direction at a higher rate as is also true in the case of a primary battery except that such primary battery would not be materially charged by the flow of such current. Since the current which actually flows through the track battery TB is dependent upon the internal resistance of the track battery and also upon the resistance of the unit $r1$, and since the total charging of the battery TB at the higher rate depends upon the duration of occupancy of the track circuit the resistance unit $r1$ will in practice be so adjusted as to allow sufficient charging or discharging of the battery TB, depending on the kind of battery used, so as to maintain the battery in good working condition.

Let us now assume that an alternating current power failure takes place and that the cessation of flow of alternating current causes the power-off relay PO to assume its deenergized position, under which condition its front contact 12 is opened and its back contact 12 is closed. Under this condition the track battery TB supplies current of inverse polarity to the track rails through a circuit which may be traced from the positive terminal of the battery TB, wire 15, back contact 12 of the power-off relay PO, wire 20, resistance unit $r2$, wire 18, track rail 1, winding of the track relay TR, other track rail 1, wire 17, and to the negative terminal of the track battery TB. The flow of this current has been indicated by dotted arrows. The ohmic value of the resistance $r2$ is so chosen as to produce safe track relay operating margins during the cessation of alternating current power when all of the current supplied to the track rails is derived from the track battery TB. If the track relay TR is a neutral relay the structure as illustrated in Fig. 1 is satisfactory in that the pole changing of the track circuit current does little harm. Should it, however, be desirable to employ a polar track relay of either the two-position or three-condition type in place of the one shown an additional contact would have to be provided on the power-off relay PO so as to connect the track relay TB across the track rails in such polarity relationship as to cause current to flow through the track relay TR in the same direction during an alternating current power interruption as flows with the power-off relay PO in its normal energized position. Such contact and circuit structure has been illustrated in Fig. 2 of the drawings where contacts 22 and 23 perform a pole changing function in addition to the switching function performed in Fig. 1 by contact 12.

Having thus shown and described two forms of the invention it is desired to be understood that these forms of the invention have been selected to illustrate the underlying principles of the invention, and apparatus whereby these principles may be carried out, and it should be further understood that various changes, modifications and additions may be made in practicing the invention without departing from the spirit or scope of the invention so long as these changes do not depart from the scope of the following claims.

What I claim is:

1. Track circuit structure of the type described comprising, a track section, a battery for one end of said section, a track relay connected across the track rails at the other end of said section, a source of alternating current, a rectifier connected to rectify current from said source to deliver a voltage higher than the voltage of said battery, and a power-off relay normally energized from said alternating current source for during the presence of alternating current causing direct current to flow from said rectifier to the track rails at said one end of said section through a circuit including said battery in bucking relationship and for during the cessation of alternating current from said source connecting said battery directly across the track rails at said one end, whereby said battery is at times charged through a circuit including said track relay.

2. A pair of track rails, a source of alternating current, a rectifier for rectifying current from said alternating current source, a battery of lower voltage than the voltage delivered by said rectifier, a power-off relay connected across said source of alternating current, a front contact on said relay for connecting said rectifier across the track rails with said battery in bucking relationship in series therewith, and a back contact on said relay for connecting said battery across the track rails in a polarity direction to cause current to flow in the same direction in the track rails when said relay assumes its deenergized position.

3. A pair of track rails, a source of alternating current, a rectifier for rectifying current from said alternating current souce, a battery of lower voltage than the voltage delivered by said rectifier, and a power-off relay connected across said source of alternating current and including means for connecting said rectifier across the track rails with said battery in buckling relationship in series therewith when said relay assumes its energized position and for connecting said battery directly across the track rails when said relay assumes its deenergized position.

4. A pair of track rails, a source of alternating current, a rectifier for rectifying current from said alternating current source, a battery of lower voltage than the voltage delivered by said rectifier, and a power-off relay connected across said source of alternating current and including means for connecting said rectifier and battery in bucking relationship in series and across the track rails when said relay assumes its energized position and for connecting said battery across the track rails when said relay assumes its deenergized position.

5. In a track circuit, the combination with a pair of track rails, a battery, an alternating current source, a rectifier connected to rectify current from said source at a higher voltage than the voltage of said battery, a resistance unit, and a power-off relay means for connecting said rectifier and said battery in buckling relationship in series and across said track rails and connecting said resistance unit in multiple with said battery when said relay means assumes its energized condition and for connecting said battery across the track rails when said relay means assumes its deenergized condition.

6. In a track circuit, the combination with a pair of track rails, a battery, an alternating current source, a rectifier connected to rectify current from said source at a higher voltage than the voltage of said battery, a first resistance unit, a second resistance unit, and a power-off relay, means for connecting said rectifier and said battery in bucking relationship in series and across said track rails and connecting said first resistance unit in multiple with said battery when said relay means assumes its energized condition and for connecting said battery in series with said second resistance unit and across the track rails when said relay means assumes its deenergized condition.

7. In a track circuit; the combination with a pair of track rails; a storage battery; a source of alternating current; a rectifier connected to rectify current from said source; a resistance unit; and a power-off relay means for connecting the output leads of said rectifier across the track rails in series with said resistance unit and said battery in multiple when said relay assumes its energized position, said resistance unit having a resistance of ohmic value such that the battery is charged by the voltage drop across said resistance unit so long as said relay means assumes its energized position, and for connecting said battery across said track rails when said relay means assumes its deenergized position.

8. In a track circuit; the combination with a pair of track rails; a storage battery; a source of alternating current; a rectifier connected to rectify current from said source; a first resistance unit; a second resistance unit; and a power-off relay means for connecting the output-leads of said rectifier across the track rails in series with said first resistance unit and said battery in multiple when said relay assumes its energized position, said resistance unit having a resistance of ohmic value such that the battery is charged by the voltage drop across said resistance unit so long as said relay means assumes its energized position, and for connecting said battery in series with said second resistance unit across said track rails when said relay means assumes its deenergized position.

9. In a track circuit; the combination with a pair of track rails; a primary battery; a source of alternating current; a rectifier connected to rectify current from said source; a resistance unit;

and a power-off relay means for when in an energized condition connecting the output leads of said rectifier in a series circuit including said resistance unit and battery in multiple and including the track rails, said resistance unit having a resistance of ohmic value such that the battery is discharged through said resistance unit so long as said relay means assumes its energized position, and for connecting said battery across said track rails when said relay means assumes its deenergized condition.

10. In a track circuit; the combination with a pair of track rails; a primary battery; a source of alternating current; a rectifier connected to rectify current from said source; a first resistance unit; a second resistance unit; and a power-off relay means for when in an energized condition connecting the out-put leads of said rectifier in series with said first resistance unit and said battery in multiple and across the track rails, said resistance unit having a resistance of ohmic value such that the battery is discharged through said first resistance unit so long as said relay means assumes its energized position and for connecting said battery in series with said second resistance unit across said track rails when said relay means assumes its deenergized condition.

11. In a track circuit, the combination with a pair of track rails forming a track section and having a track relay connected across the rails at one end, a source of alternating current, a rectifier, a power-off relay, first and second resistors, and a storage battery associated with the other end of said track section, circuit means for normally supplying energy to said power-off relay from said alternating current source so as to pick up its contacts but acting upon a failure of said source to deenergize said power-off relay so as to allow its contacts to drop away, circuit means for supplying energy from said alternating source to the input of said rectifier for supplying an output with a voltage slightly higher than the voltage of said storage battery, circuit means for connecting the output of said rectifier across the rails of said track section at such other end in series with said storage battery with its polarity in opposition, circuit connections including a front contact of said power-off relay for connecting said first resistor in multiple with said battery to thereby limit the charging rate of said storage battery to a normal value while said track section is unoccupied, other circuit means including a back contact of said power-off relay for connecting said second resistor in series with said battery across the rails of said section at such other end when said power-off relay is deenergized, whereby the normal charging rate of said storage battery is determined by the value of said first resistor and both said first resistor and said battery act as limiting resistors when the track section is occupied by a train so long as said alternating current source is supplying the energy, and whereby said second resistor serves as a limiting resistor when track section is occupied by a train whenever said alternating current source fails to supply energy.

12. In a track circuit, the combination with a pair of track rails forming a track section and having a track relay connected across the rails at one end, a source of alternating current, a rectifier, a power-off relay, first and second resistors, and a primary battery associated with the other end of said track section, circuit means for connecting said power-off relay to said alternating current source to cause its contacts to pick up while energy is supplied but acting upon failure of said source to supply energy to allow its contacts to drop away, circuit connections for supplying energy from said alternating current source to the input of said rectifier for supplying a direct current output having a potential slightly higher than the potential of said primary battery, circuit means connecting the output of said rectifier across the rails of said track section at such other end in series with said primary battery with its polarity in opposition, circuit means including a front contact of said power-off relay for connecting said first resistor in multiple with said primary battery when said power-off relay is energized to thereby provide a path for the energy supplied to said track circuit from said rectifier under normal unoccupied conditions of said track section of such a value as to provide a potential drop across such first resistor slightly less than the potential of said primary battery to allow a small normal discharge of said primary battery, and other circuit means including a back contact of said power-off relay for connecting said second resistor in series with said battery across the rails of said track section at such other end when said power-off relay is deenergized, whereby the normal discharging rate of said primary battery is determined by said first resistor and both said first resistor and said primary battery act as limiting resistors with respect to the output of said rectifier when the track section is occupied by a train during the supply of power from said alternating current source, and whereby said second resistor serves as a limiting resistor with respect to said primary battery when said track section is occupied by a train during the failure of said alternating current source to supply power.

13. In a track circuit of the type described, the combination with a pair of track rails, a direct current track relay connected across the track rails at one end, a source of alternating current at the other end, a power-off relay connected to and energized from said source, a rectifier, a track battery, and circuit means for connecting said rectifier so as to rectify current from said source and apply the rectified current to said other end of the track rails through a partial circuit including said track battery in series in a polarity direction so as to be charged by the rectified current when said power-off relay is in an energized condition and for connecting said battery across the track rails at such other end when said power-off relay is in its deenergized condition.

14. In a track circuit of the type described, the combination with a pair of track rails, a direct current track relay connected across the track rails at one end, a source of alternating current at the other end, a power-off relay connected to and energized from said source, a rectifier, a track battery, and circuit means for connecting said rectifier so as to rectify current from said source and apply the rectified current to said other end of the track rails through a partial circuit including said track battery in series in a polarity direction so as to be charged by the rectified current when said power-off relay is in an energized condition and for connecting said battery across the track rails at such other end when said power-off relay is in its deenergized condition and in a polarity direction such that current flows in the same direction in the track rails as it did when said power-off relay assumed its energized condition.

HARRY L. BLACK.

REFERENCES CITED

The following references are of record in the file of this patent:

UNITED STATES PATENTS

| Number | Name | Date |
|---|---|---|
| 1,804,663 | Zierdt | May 12, 1931 |
| 1,824,251 | Willing | Sept. 22, 1931 |
| 1,916,307 | Gilson | July 4, 1933 |
| 2,045,992 | Nicholson | June 30, 1936 |
| 2,091,708 | Gilson | Aug. 31, 1937 |
| 2,101,207 | Williamson | Dec. 7, 1937 |